(No Model.) 2 Sheets—Sheet 1.
C. W. HUNT.
CAR TRUCK.
No. 495,339. Patented Apr. 11, 1893.
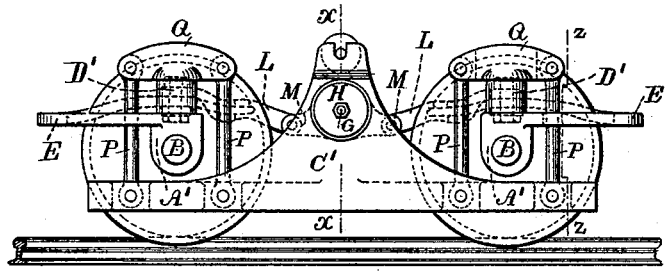
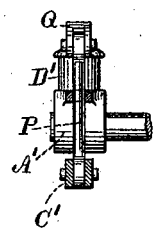
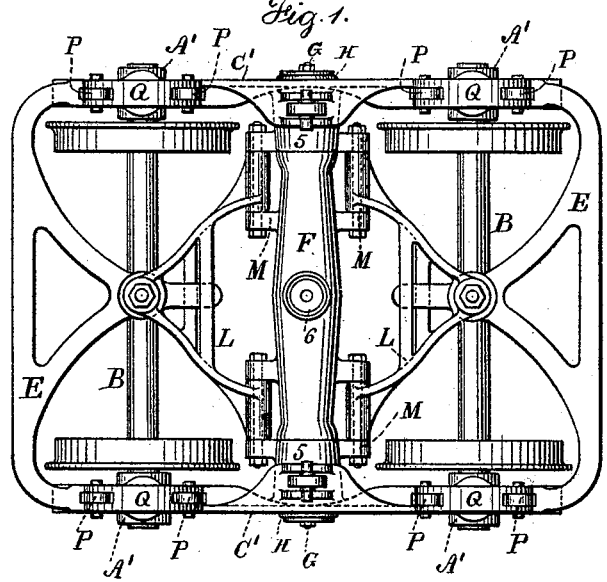
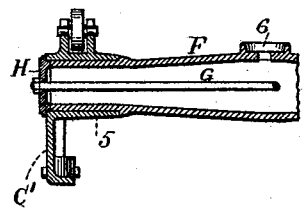

(No Model.) 2 Sheets—Sheet 2.
C. W. HUNT
CAR TRUCK.
No. 495,339. Patented Apr. 11, 1893.
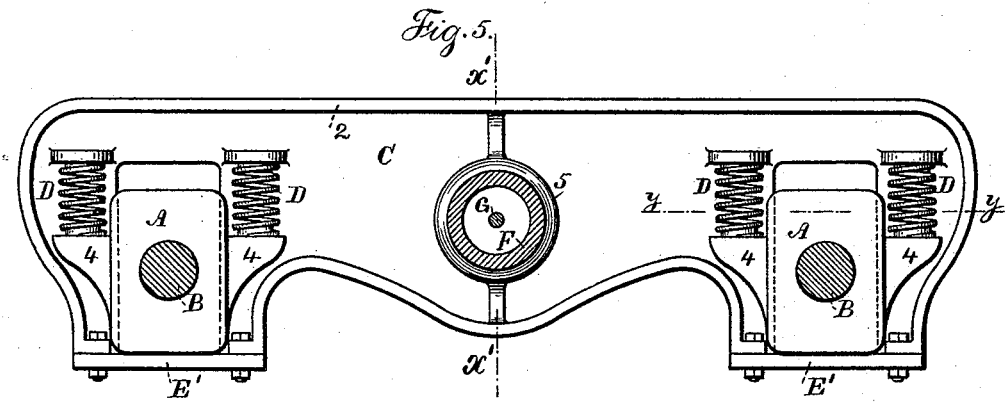
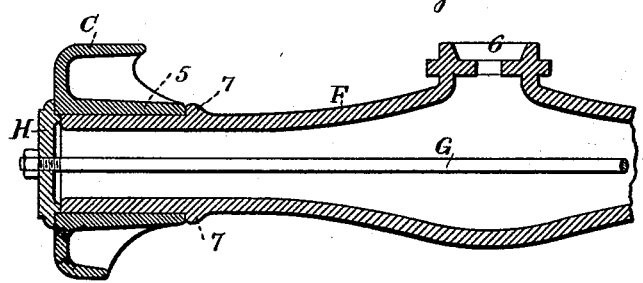 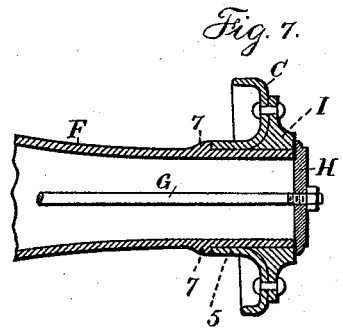
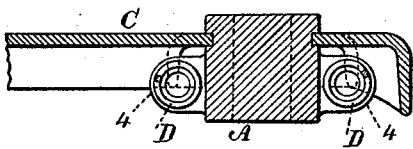
Witnesses:
J. Stait
Chas H. Smith
Inventor:
Charles W. Hunt
per Lemuel W. Serrell
Atty

UNITED STATES PATENT OFFICE.

CHARLES W. HUNT, OF WEST NEW BRIGHTON, NEW YORK.

CAR-TRUCK.

SPECIFICATION forming part of Letters Patent No. 495,339, dated April 11, 1893.

Application filed February 4, 1892. Renewed February 14, 1893. Serial No. 462,329. (No model.)

*To all whom it may concern:*

Be it known that I, CHARLES W. HUNT, a citizen of the United States, residing at West New Brighton, in the county of Richmond and State of New York, have invented an Improvement in Car-Trucks, of which the following is a specification.

The object of this invention is to simplify the construction of the car truck and to adapt the same to the inequalities that so often exist in tracks that are used in mines and in engineering work. The two side frames are of metal and adapted to receive or be connected to axle boxes, and these side frames are united by a transom or center beam that passes at its ends into bearings or sockets in the side frames, so that the necessary strength is obtained, and the transom or center bearer is adapted to receive the king bolt and the frames are free to move in a vertical direction at the ends of the cross bearer so that the truck frame may accommodate itself to inequalities in the track over which it is traveling, but the truck frame maintains the parallelism of the axle boxes.

In the drawings Figure 1 is a plan view of a truck with my improvement thereon. Fig. 2 is an elevation of the same. Fig. 3 is a sectional elevation of one frame and the axle box and supports at the line Z Z, Fig. 2. Fig. 4 is a section at the line X X, Fig. 2. Fig. 5 is an elevation of the inner side of one truck frame in a modified form and a cross section of the central bearer. Fig. 6 is a section at the line X' X' of Fig. 5. Fig. 7 is a similar section representing the connection between the cross bearer and the side frame in a modified form, and Fig. 8 is a sectional plan view of one axle box and of the frame at the line Y Y, Fig. 5.

The axle boxes A and axles B are of any desired character, and the wheels may be either inside or outside the axle boxes. The side frames C may be provided with openings for the reception of the axles boxes A, as seen in Fig. 5, and where there are springs D they may rest upon brackets 4 extending out from the axle boxes A and the upper ends of the springs may rest against the under side of the top flange 2, or special flanges upon the side frames C may be provided for the upper ends of such springs D, and the tie plates E' are provided across the openings into which the axle boxes A are received as usual; but my present improvements are equally available with the side frames C' with suspending links P for the cross heads Q over the axle boxes A' and springs D', as shown in Figs. 1 and 2.

In consequence of the side frames C or C' of the truck being of metal and having flanges, they are very stiff and at the same time comparatively light, and these side frames may be of malleable iron or of wrought iron or steel, either cast or struck up in dies. In the middle of the side frames there are cylindrical sockets 5 for the reception of the round ends of the transom or cross bearer F. This transom may be of any desired form for securing the required strength and it is provided with a central bearing 6 at the king bolt, and there are shoulders at 7 that rest against the inner ends of the sockets 5 upon the side frame C, and the parts are firmly secured together, preferably by the tie bolt G that passes longitudinally through the transom and through the cap plates H against the outer surfaces of the side frames C or C', so that by means of the tie bolt and these plates, the side frames C will be reliably secured upon and connected with the transom F and at the same time a slight turning motion of the side frames upon the tubular ends of the transom is allowed for, in order that the respective ends of the side frames may rise or fall in relation to the opposite side frame, thereby allowing for a movement or working of the one frame in relation to the other as the wheels pass over inequalities in the track.

In Fig. 7 I have represented a collar I as riveted upon the surface of the side frame C and surrounding the outer end of the transom, so as to give additional strength to the connection between the transom and the side frame, and in this form the cap plate H rests against the collar I instead of against the surface of the side frame C.

It will be understood that this construction of truck frame is adapted to coal cars, freight cars, platforms, &c.

In Figs. 1 and 2 I have shown the yokes E as extending from one axle box to the other, and the hinged frames L as connected at M to the sides of the transom F. These parts are described and represented in my patent No. 452,136, granted May 12, 1891.

I claim as my invention—

1. The combination with a hollow metallic cross bearer or transom, of metallic side frames having openings therein for the reception of the ends of the transom and cap plates and a tie rod passing longitudinally through the transom and the cap plates substantially as specified.

2. In a truck for cars, the side frames of metal having stiffening flanges and openings for the axle boxes and tubular sockets, in combination with a transom or cross bearer having round ends passing into the cylindrical sockets of the side frames, a cross bolt passing through the tubular transom and cap plates and nuts at the ends of the transom and outside the side frames, substantially as set forth.

3. The metallic side frames having stiffening flanges and openings for the axle boxes and tubular sockets, in combination with a transom or cross bearer having round ends fitting into the sockets upon the side frames, collars around the outer ends of the transom and fastened to the side frames, a tie bolt passing through the bearer, cap plates at the outer ends of the transom and nuts for securing the parts together, substantially as set forth.

4. The combination in a car truck with the metallic transom or cross bearer having cylindrical ends, of metallic side frames having cylindrical sockets for the reception of the cylindrical ends of the transom, and in which they are free to turn, and means for securing the frames to the transom, substantially as set forth.

Signed by me this 1st day of February, 1892.

CHAS. W. HUNT.

Witnesses:
GEO. T. PINCKNEY,
WILLIAM G. MOTT.